United States Patent [19]

Umeda et al.

[11] Patent Number: 4,831,658

[45] Date of Patent: May 16, 1989

[54] BINARY SIGNAL PRODUCING APPARATUS FOR OPTICAL CHARACTER RECOGNITION

[75] Inventors: Tetsuo Umeda; Kazumi Nakano; Shigenobu Kasuya, all of Tokyo, Japan

[73] Assignee: NEC Corporation, Japan

[21] Appl. No.: 119,663

[22] Filed: Nov. 12, 1987

[30] Foreign Application Priority Data

Nov. 12, 1986 [JP] Japan .................... 61-269272

[51] Int. Cl.$^4$ ............................... G06K 9/38
[52] U.S. Cl. ....................... 382/52; 382/27; 382/50
[58] Field of Search ............ 382/52, 50, 51, 53, 382/27, 54

[56] References Cited

U.S. PATENT DOCUMENTS

| | | | |
|---|---|---|---|
| 3,267,293 | 8/1966 | Hinds | 382/50 |
| 3,872,434 | 3/1975 | Duvall et al. | 382/50 |
| 4,408,343 | 10/1983 | Neill et al. | 382/52 |
| 4,449,240 | 5/1984 | Yoshida | 382/50 |
| 4,468,704 | 8/1984 | Stoffel et al. | 382/52 |
| 4,586,082 | 4/1986 | Wilkinson | 382/52 |
| 4,601,056 | 7/1986 | Habitzreiter et al. | 382/50 |
| 4,675,909 | 6/1987 | Egami et al. | 382/50 |

OTHER PUBLICATIONS

Gagnon et al., "General Purpose Scan/Digitizing Method", *IBM Tech. Disc. Bulletin*, vol. 21, No. 9, Feb. 1979, pp. 3673-3674.

*Primary Examiner*—Leo H. Boudreau
*Assistant Examiner*—Joseph Mancuso
*Attorney, Agent, or Firm*—Laff, Whitesel, Conte & Saret

[57] ABSTRACT

An optical character reader distinguishes between black and white image signals by comparing a center reader with readings from surrounding areas. Variations on the surface of a paper bearing the image can add or subtract values so that the comparison may be in error. The invention overcomes the problem by using logic circuits to add, subtract and compare signals out of a mask in order to improve the accuracy of the comparison between the center reading and the readings from the surrounding areas.

8 Claims, 2 Drawing Sheets

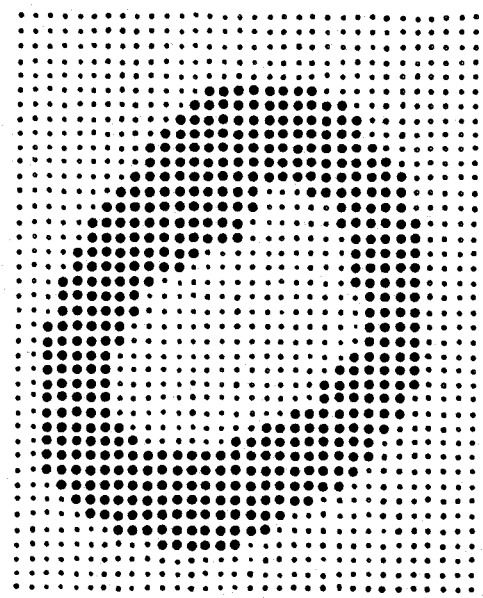
FIG. 1
FIG. 3
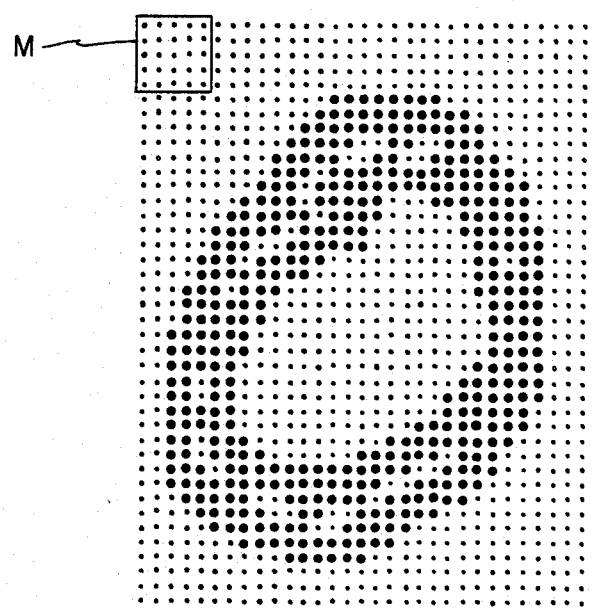
FIG. 2

BINARY SIGNAL PRODUCING APPARATUS FOR OPTICAL CHARACTER RECOGNITION

BACKGROUND OF THE INVENTION

The present invention relates to an optical character recognition apparatus, and more particularly to a binary signal producing apparatus which produces an optimum binary signal from a multi-value image signal obtained from a scanner.

A conventional method of two-dimensionally processing a multi-value image signal, in a real-time manner, employs a mask constructed by a n×n matrix. In this method, the value of a center element in the mask is compared with the average of the values of elements which are contiguous to the center element. Thus, the center element is determined as black when the value of the center element is smaller (darker) than the average of the values of contiguous elements and vice versa. FIG. 1 shows an example of such mask constructed by a 5×5 matrix.

The conventional binarization method can provide a good result when a suitable size of a mask is selected, but only so long as the size of characters to be recognized and the width of their strokes are uniform. However, the conventional method encounters some problems when there are large variations in the character size and the stroke width, for instance, when a postal code and an address description on a mail article are recognized. One of the problems is that, when a stroke width of the character is larger than the width of the mask, the value of the center element could become substantially equal to the average of the values of the contiguous elements. Thus, the center element is frequently determined as white. FIG. 2 illustrates this problem. In this figure, the width of the mask M is smaller than the stroke width of the character. Therefore the central portion of the stroke is erroneously determined as white. This phenomenon is known as "center line omission" and could seriously affect the character recognition. Reversally, FIG. 3 show a character pattern corresponding to an optimum binary signal.

Further, even when a mask has a sufficiently large size with respect to the size of the character, there is a problem because a portion of a character is erroneously interpreted as white under the influence of surrounding areas.

SUMMARY OF THE INVENTION

Accordingly, an object of the present invention is to provide a binary signal producing apparatus for optical character recognition, which is capable of producing an optimum binary signal even when using a mask technique.

According to the present invention, a binary signal producing apparatus comprises a first mask having a predetermined two-dimensional size of a register array for receiving a multi-value image signal delivered from a character scanner. An average value calculating circuit gives an average value among the values where are indicative of signal levels of register elements which are contiguous to a center register element in the first mask. An adder adds a predetermined value to a value which is indicative a signal level of the center register element in order to produce an addition value. A subtractor subtracts a predetermined value from the value of the center register element to produce a subtraction value. A first comparator compares the addition value with the average value to produce a first binary signal. A second comparator compares the subtraction value with the average value to produce a second binary signal. A second mask having a predetermined two-dimensional size of a register array for receives a third binary signal. The second mask delivers a plurality of contiguous binary signals which have previously been binarized. An AND gate receives the second binary signal and the plurality of contiguous binary signals to produce an AND resultant signal. An OR gate receives the first binary signal and the AND resultant signal to produce a final binary signal. The final binary signal is supplied to the second mask, as the third binary signal.

BRIEF DESCRIPTION OF THE DRAWINGS

FIG. 1 shows an example of a two-dimensional mask which is used for processing of an image signal output from a scanner;

FIG. 2 shows an example of a character pattern reproduced by a binary signal which is produced according to a conventional technique;

FIG. 3 shows an example of a character pattern reproduced by an optimum binary signal which is produced according to the present invention.

DESCRIPTION OF THE PREFERRED EMBODIMENT

Figure 4:
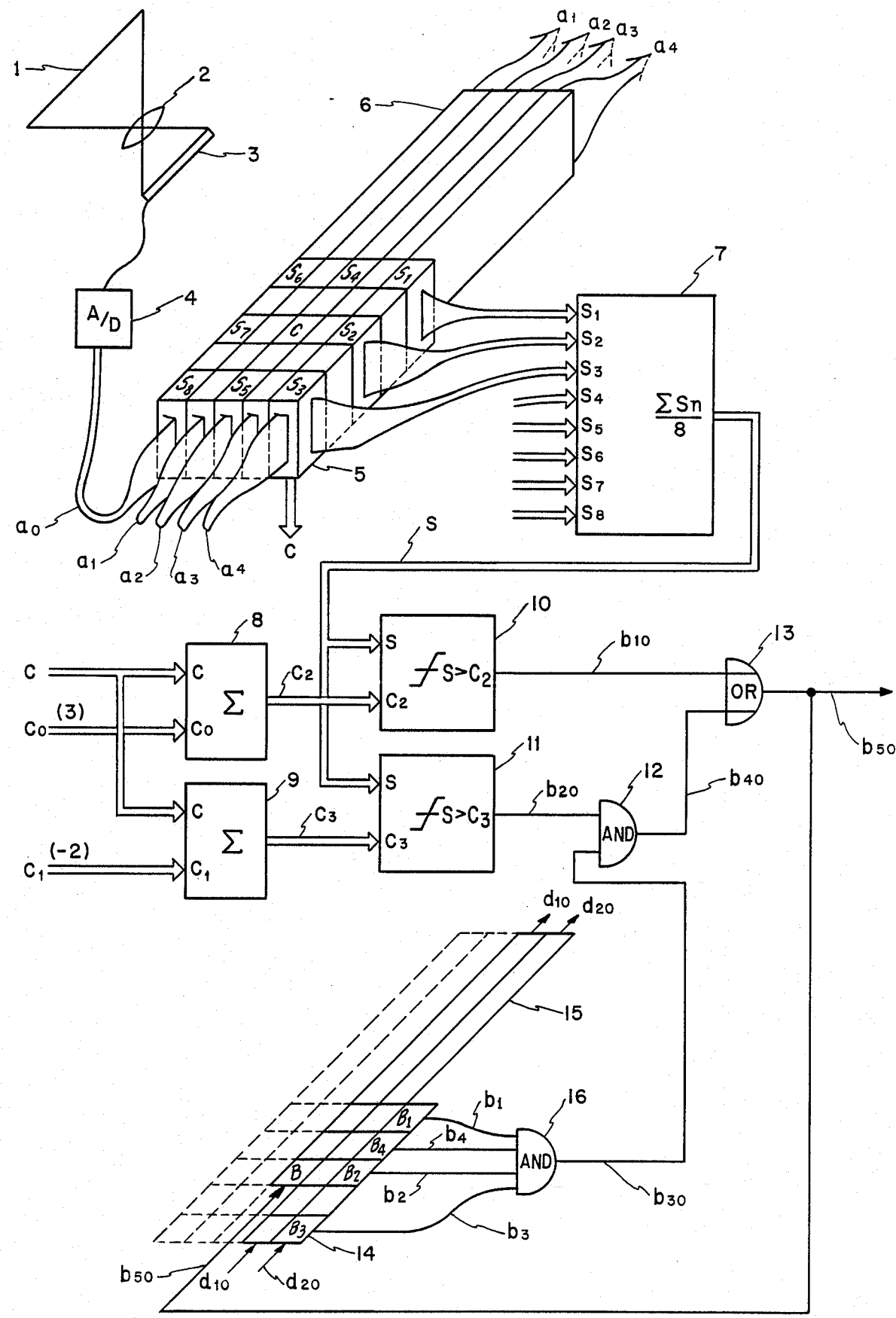
FIG. 4 is a block diagram of an embodiment according to the present invention.

FIG. 4 shows an embodiment of the present invention. An image 1 of a character which is to be recognized is scanned through a lens 2 by a CCD scanner 3. A resulting scanned signal from the CCD scanner 3 is then supplied to an A/D (analog to digital) converter 4 in which the scanned signal is converted into a multi-value digital signal a0 of 6 bits, for example. The resulting binary signal indicates a degree from darkness to brightness in terms of a value from a 0-level to a 63-level. This digital signal a0 is supplied to a two-dimensional mask 5 which is capable of processing multi-value signal such that the two-dimensional multi-value image is reproduced and processed to produce a binary signal.

In the embodiment, the two-dimensional mask 5 has a size of 5×5 array. The mask 5 is connected to shift registers 6. The total longitudinal length of the mask 5 and shift registers 6 is selected to be equal to the length of an array of the CCD scanner 3, so that at least a portion of the two-dimensional image can be reproduced in the mask 5.

The 6-bit signal data of a plural picture elements S1 to S8 which are contiguous to the center picture element C in the mask are supplied to an average value calculating circuit 7 in which a average value s is calculated. At the same time, signal data of the center element C are supplied to adders 8 and 9. In these adders 8 and 9, the value c of the signal data at the center element C is added to each of two different predetermined values c0 and c1 (minus value). The addition result values c2 and c3 are obtained from the respective adders 8 and 9. These values c2 and c3 are then supplied to comparators 10 and 11, in which the addition result values c2 and c3 are compared with the averages. Two binary output signals b10 and b20 are obtained from the comparators 10 and 11, respectively. The binary signal b10 has a value "1", for example, indicating a character portion when the addition result value c2 is lower than the average value s (c2<s). The binary signal b20 has the value "1", with the relationship of c3<s. The binary signal b20 delivered from the comparator 11 is supplied to an AND gate 12 in which an AND output between the binary signal b20 and another binary signal b30 (described later) is obtained. The resultant binary signal b40 is extracted from the AND gate 12. The binary signal b40 is supplied to an OR gate 13 in which a OR output between the binary signal b40 and the binary signal b10 delivered from the comparator 10 is produced. The resultant binary signal b50 is delivered from the OR gate 13. This binary signal b50 from the OR gate 13 serves as an output binary signal of the binarization process, according to the present invention.

The binary signal b50 is supplied to a two-dimensional mask 14 which is used for processing a binary signal. In the mask 14, a picture element B corresponds to the center of the mask 14. The binary signal b50 is supplied to the center of the mask 14 so that a two-dimensional image constructed by the binary signal which has already been binarized is stored in the mask 14. The mask 14 is constructed in such a way that it stores the same geometrical portion is stored in the mask 5. Namely, the binary signal of the picture element B at the center of the mask 14 is a binary signal which is produced by binarizing a multi-value c at the center element C of the mask 5. Similarly, binary signals b1, b2, b3 and b4 of picture element B1, B2, B3 and B4, for contiguous element in the mask 14, correspond to multi-value signals s6, s7, s8 and s4 at the contiguous picture elements S6, S7, S8, and S4 in the mask 5. Further, shift registers 15 have the same size (length) as the shift registers 6. In the mask 14 and the shift registers 15 shown in FIG. 4, the portions indicated by broken lines correspond to portions of picture elements which have not yet been binarized. Therefore, circuitry hardwares corresponding to these portions are not required in practice.

An AND output among binary signals b4, b1, b2 and b3 is produced by an AND gate 16 as an output signal b30. The output signal b30 is indicative of whether or not all of the four contiguous elements B4, B1, B2 and B3 which have previously been binarized, are black ("1"). This output signal b30 is supplied to the other input terminal of the AND gate 12. Therefore, the AND gate 12 enables a passage therethrough of the binary signal b20 of "1" (character portion) when all of these four contiguous elements B1 to B4 have prevously been binarized as "1" (character portion), in other words, as black.

The operation of the image-binarization process according to the present invention will now be described. As described above, it is assumed that the two-dimensional mask 5 has a 5×5 matrix, and that the contiguous picture elements S1 to S8 are applied to determine a state of the binary signal at the center element C. The average S of the value of the contiguous elements S1 to S8 is determined by the average value calculating circuit 7. It is now assumed that the thus calculated average value S is a 40-level, signal for instance.

In the adder 8, the predetermined value c0 is added to the center element value c. The following description gives the reason of such an addition operation. A surface of a sheet on which characters are written has microscopic variations in brightness. Accordingly, if the center element C is merely interpreted as black when its value is smaller than the average value S, noise may be generated in a binary signal due to the influence by the variations in the brightness of the sheet surface. Therefore, the center element C is interpreted as being black only when there is a difference exceeding the predetermined value c0 between the center element value c and the average value s. With this arrangement, if the predetermined value c0 is set to 3, for instance, the center element C can be interpreted as black when its value c is equal to or less than 36 since the means value s is 40.

The formentioned arrangement, however, may lead to the following drawback. Namely, during a processing of a black portion of a character which is larger than the mask 5, the center element C cannot be interpreted as black if its value is not smaller than the mean value s by a difference exceeding the predetermined value c0, even when contiguous elements have previously been integrated as black. Therefore, with this arrangement, the center element C is erroneously interpreted as white in such a case.

The present invention is featured to eliminate this drawback, and is based on the principle that the center element C can be interpreted as black even when the value of the center element C is slightly larger than the average value s if a plurality contiguous elements, which have previously been binarized, are black.

In FIG. 4, the value of the center element C is added to the other predetermined value C1 (minus value) by the adder 9. The addition resultant value C3 is then supplied to the comparator 11 to be compared with the average value s for producing the binary signal b20. In the present invention, the predetermined value C1 is determined so as to enable the center element C to be interpreted as black, both when the value of the center element C is smaller than the average value s and when the value of the center element C is slightly larger than the average value s. If the predetermined value c1 is set to −2, for instance, the center element C is interpreted as black even when its value is 41 while the average value is 40.

The AND gate 12 produces the AND output b40 between the binary signal b20 and the signal b30 delivered from the AND gate 18. Accordingly, the binary signal b40 of "1" indicates that the value of the center element C is either smaller than the average s of the values of the contiguous elements or slightly larger than the average value simultaneously previously binarized contiguous picture elements among the contiguous elements are interpreted as black. Therefore, the drawback of the conventional technique is overcomed.

Finally, the OR output between the binary signal b10 from the comparator 10 and the binary signal b40 from the AND gate 12 is extracted through the OR gate 13. The binary signal b50 is delivered as the final binary signal for the center element C.

In the embodiment, the 5×5 matrix is used for the masks 5 and 14. But it is, of course, to be understood that the size and configuration of the masks may be selected arbitrarily.

As described above, the present invention can overcome the drawback of the conventional technique known as "the center line omission" by merely adding a few circuits to the conventional differentiation-type binarization apparatus.

What is claimed is:

1. A binary signal producing apparatus comprising:
a scanner for scanning a character to produce a character signal;

an A/D converter responsive to said scanner for converting said character signal delivered from said scanner into a multi-value digital signal;

a first mask of contiguous register elements and responsive to said A/D converter having a predetermined two-dimensional size for receiving said multi-value digital signal delivered from said A/D converter, said first mask being a storage shift register;

an average value calculating means responsive to said first mask for calculating an average value among values at first contiguous register elements in said first mask, said contiguous register elements being aligned around a first center register element in said first mask;

a first comparator means for comparing a value at said first center element and said average value to deliver a first binary signal, said first binary signal having a state which indicates a character part when the value at said first center register element is darker than the said average value over a predetermined value;

a second comparator means for comparing the value at said first center register element and said average value to deliver a second binary signal, said second binary signal having a state which indicates a character part even when the value at said first center register element is brighter than said average value within a predetermined value;

a second mask having a predetermined two-dimensional size for receiving a third binary signal, said second mask being a storage shift register;

a first AND gate for receiving a plurality of binary signals at second contiguous register elements in said second mask, said second contiguous register elements in said second mask being aligned around a second center register element in said second mask, said second center register element in said second mask, said second center register element in said second mask corresponding to said first center register element in said first mask, said second contiguous register elements being processed in a time sequence which is prior to said second center register element;

a second AND gate coupled to receive an output of said first AND gate and said second binary signal delivered from said second comparator means; and an OR gate coupled to receive said first binary signal delivered from said first comparator means and an output of said second AND gate to produce an output binary signal as said third binary signal, said third binary signal being used for character recognition.

2. An apparatus according to claim 1, wherein said second mask has a size corresponding to a size of a part of said first mask.

3. A binarization apparatus comprising:

scan converter means for scanning a character to deliver a multi-value digital image signal;

first shift register means having contiguous register stages and responsive to said scan converter means for receiving said multi-value digital image signal, said first shift register means having a shift range associated with a scanning range of said scan converter means;

average value calculating means responsive to said first shift register means for calculating an average value among a plurality of multi-value image signals at a plurality of contiguous register stages in said first shift register means, said plurality of contiguous register stages being disposed around a center register stage, said center register stage being pre-determined in said first shift register means;

first comparator means for comparing the multi-value digital image signal of said center register stage with said average value to produce a first binary signal, said first binary signal having a stage which indicates a character portion when said multi-value digital image signal of said center register stage has a level smaller than said average value over a predetermined value;

second comparator means for comparing said multi-value digital image signal of said center register stage with said average value to produce a second binary signal, said second binary signal having a stage which indicates a character portion even when said multi-value digital image signal of said center register stage is brighter than said average value within a predetermined value;

second shift register means having contiguous stages for receiving a third binary signal, said second shift register means having a shift range associated with said scanning range of said scan converter means;

a first AND gate for receiving a plurality of binary signals of a plurality of second contiguous register stages in said second shift register means, said plurality of second contiguous register stages being disposed around a second center register stage, said second center register stages being predetermined in said second shift register means;

a second AND gate for receiving said second binary signal delivered from said second comparator means and an output signal delivered from said first AND gate; and an OR gate for receiving said first binary signal delivered from said first comparator means and an output signal delivered from said second AND gate to produce said third binary signal which is to be supplied to said second shift register means, whereby said third binary signal is delivered as an output binary signal of said binarization apparatus.

4. A binarization circuit comprising:

a first mask having register elements forming a predetermined two-dimensional size for receiving a multi-value image signal obtained by scanning an image;

an average value calculating circuit responsive to said first mask for calculating an average value among values which are indicative of signal levels of register elements which are contiguous to a center register element in said first mask;

an adder for adding a predetermined value to a value which is indicative of a signal level of said center register element to produce an addition value;

a subtracter for subtracting a predetermined value from said value which is indicative of the signal level of said center register element to produce a subtraction value;

a first comparator for comparing said addition value obtained by said adder with said average value obtained by said average value calculating circuit to produce a first binary signal which is representative of a character pattern;

a second comparator for comparing said subtraction value obtained by said subtracter with said average value to produce a second binary signal which is representative of a character pattern;

a second mask having a predetermined two-dimensional size for receiving a third binary signal, said second mask delivering a plurality of contiguous binary signals which have previously been binarized;

a first AND gate for receiving said plurality of contiguous binary signals from said second mask to produce a first AND signal;

a second AND gate for receiving said second binary signal delivered from said second comparator and said first AND signal delivered from said first AND gate to produce a second AND signal; and an OR gate for receiving said first binary signal delivered from said first comparator and said second AND signal to produce said third binary signal.

5. A binary signal producing apparatus for character recognition comprising:

a first mask having a predetermined two-dimensional size formed of a register array for receiving a multi-level character signal;

an average calculating means for calculating an average among signal levels of contiguous register elements which are disposed around a center register element in said first mask;

an adder for adding a predetermined level to a level of said center register element to produce an addition level;

a subtracter for subtracting another predetermined level from the level of said center register element to produce a subtraction level;

a first comparator for comparing said addition level with said average to produce a first binary signal;

a second comparator for comparing said subtraction level with said average to produce a second binary signal;

a second mask having a predetermined two-dimensional size formed of a register array for receiving a third binary signal, said second mask delivering a plurality of contiguous binary signals which have previously been binarized with respect to the signal level of said center register element;

an AND gate for receiving said second binary signal and said plurality of contiguous binary signals to produce an AND resultant signal; and an OR gate for receiving said first binary signal and said AND resultant signal to produce a final binary signal, said final binary signal being supplied to said second mask as said third binary signal.

6. A character reader comprising scanner means for casting an image of a character upon a scanner surface having a plurality of reading areas, means for transferring scanner readings appearing at each of said reading areas into a mask having a matrix of elements corresponding to said reading areas, averaging means responsive to said elements for averaging the readings in the matrix elements at the periphery of a central area, adding two predetermined values to said reading in the matrix element in said central area, logic means responsive to said averaging means for comparing readings in said central element and readings having said two predetermined values with said average reading, means for feeding back the output of said logic means for adjusting the output of said logic means, two masks each having a matrix of elements coupled to store said signals of said reading areas, a first of said two masks having a coupling to said scanner for said transfer of said readings, a second of said two masks having a coupling to said first mask via said logic means for controlling a transfer of signals between said two masks, said means for feeding back said signal being coupled to feed back to central element in said second mask, two adders, means for coupling a center element in said first mask to a first input of each of said adders, means for applying an individually associated one of said predetermined values to each of said adders whereby the outputs of said adders represent two possible values, and two comparators each having an input, means for applying the output of said averaging means to an input one each of said comparators, whereby said comparators compare with averaged reading with a combination of the center value reading and an individually associated one of said two predetermined values.

7. The character reader of claim 6 wherein said logic means combines an output of said second mask which is a combination of signals from the periphery of a central element with an output of one of said comparators, the output of said logic means being the character reader output.

8. The character reader of claim 7 and means responsive to the output of said character reader for energizing the central element in said second mask.

* * * * *